July 26, 1955   C. L. EKSERGIAN ET AL   2,713,923
BRAKE SHOE LINING FOR DE-ICING BRAKE SURFACES
Filed Dec. 8, 1952
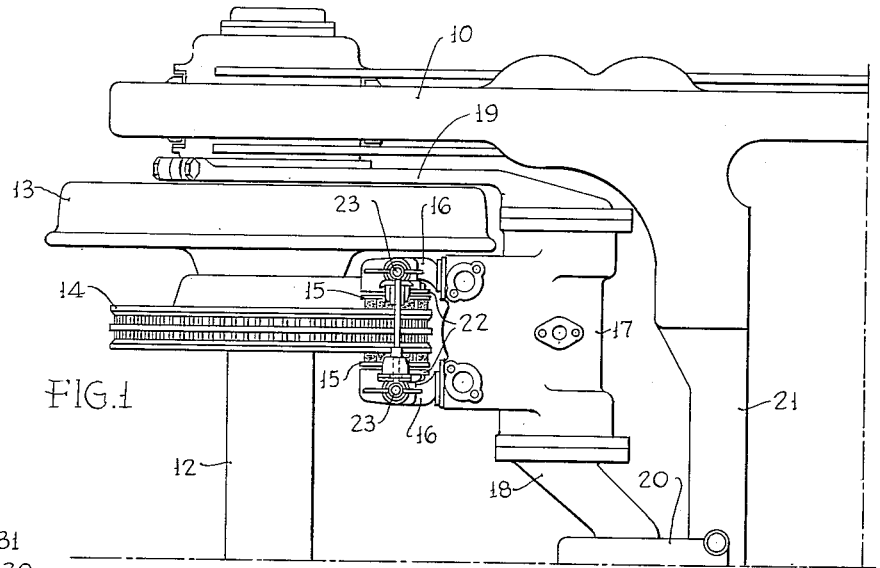
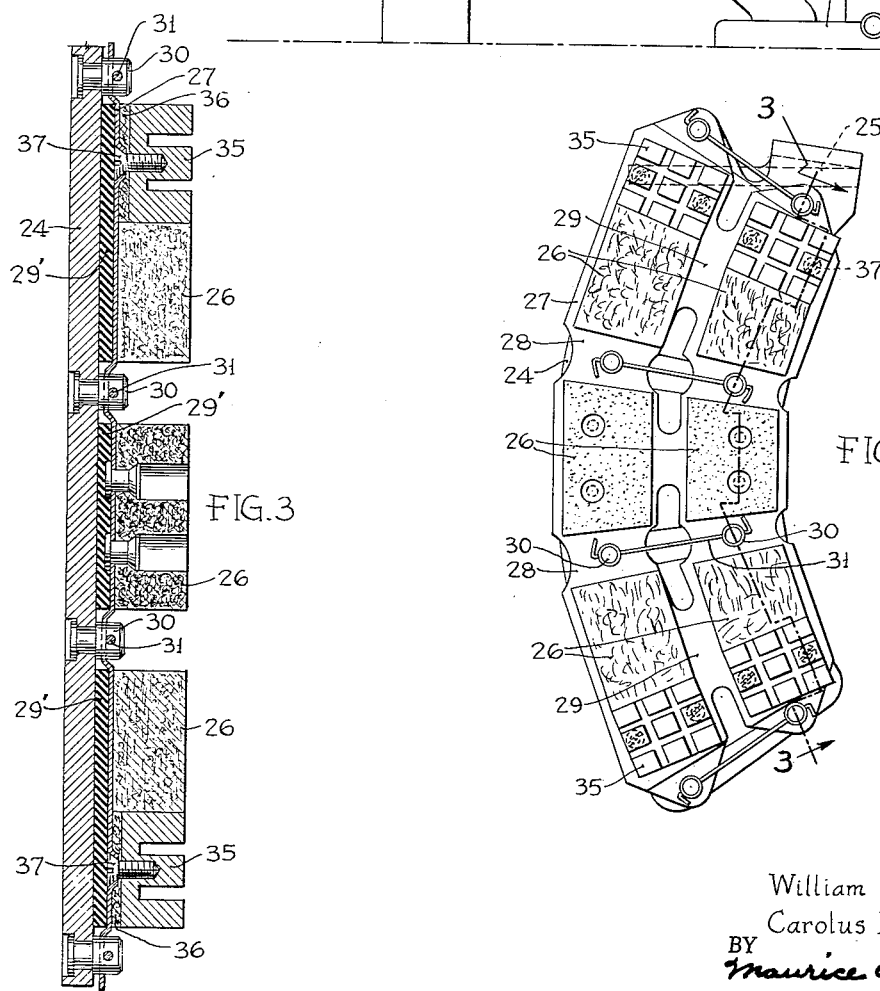
INVENTORS
William Mann
Carolus L. Eksergian
BY
Maurice A. Crews
ATTORNEY

United States Patent Office 2,713,923
Patented July 26, 1955

2,713,923
BRAKE SHOE LINING FOR DE-ICING BRAKE SURFACES

Carolus L. Eksergian, Media, Pa., and William Mann, Grosse Pointe, Mich., assignors to The Budd Company, Philadelphia, Pa., a corporation of Pennsylvania Application December 8, 1952, Serial No. 324,716

7 Claims. (Cl. 188—251)

This invention relates to brake shoe linings, particularly to linings which remove ice film from the brake surfaces to maintain good braking conditions at all times and has for an object the provision of improvements in this art.

The invention has been developed and practiced with disk or radial type railway brakes and will be described in this connection, though without limitation thereby.

The brake shoe assembly with which the present invention is identified is shown in the patent to Eksergian et al., 2,451,326, and Gaenssle, 2,451,329. The lining for the shoes is disclosed in the patent to Schumacher, 2,431,774, the same comprising spaced end and intermediate pads, the end pads being of woven composition material with greater yieldability and scouring action and an intermediate pad of molded composition material of lesser yieldability and scouring action.

Such a segmented lining has been found to give excellent service under all normal conditions; but under conditions where ice forms on the brake disk the lining does not remove it quickly enough to provide the immediate brake application which is desired and essential for safety.

Heretofore, it has been proposed to intersperse lined inserts of abrasive material in the brake linings and, while this served to eliminate the ice film satisfactorily, it wore the brake disk more rapidly than desired.

According to the present invention, there are provided terminal lining elements which are adequate for immediately removing the ice film for either direction of movement but which do not have undue abrasive action on the brake surface. A bronze metal insert in one of the end segments has been found to give good results and long service. The metal element is preferably backed by a resilient cushion and is formed with a grid surface to prevent accumulation of dirt.

One embodiment of the invention is shown in the accompanying drawing, wherein:

Fig. 1 is a top plan view of a portion of a railway truck to which brakes made according to the present invention are applied;

Fig. 2 is an elevation of a single brake shoe unit having several lining segments and including ice removing elements embodying the present invention; and Fig. 3 is a section taken on the line 3—3 of Fig. 2.

In Fig. 1 the general organization is shown to include a truck frame 10 supported by a wheel and axle unit comprising an axle 12, wheels 13, and disk-like brake rotors 14. There is a brake rotor or disk 14 associated with each wheel and both wheels and rotor disks are rigid with and rotate with the axle.

Adjacent each side or braking surface of each disk 14 there is disposed a segmental brake shoe 15 operated by a lever 16 associated with an actuating cylinder 17 carried by a transversely extending brake support member 18 having its ends supported from the ends of the wheel-axle assembly, as by arms 19, and having its intermediate portion supported, as by a connection 20, from the truck frame transom 21, all as more fully explained in Patent 2,413,614.

For convenience, the shoes 15 are each demountably secured to a flat-faced mounting member 22 which is suitably carried by the end of a lever 16, as shown in Patent 2,402,386. A readily detachable connection 23 may be used to hold the shoe in place on the mounting, as disclosed in Patent 2,504,712.

The shoe proper may comprise a rigid metal backing plate 24 seated against the flat face on the mounting member 22 and held in place thereon by the engagement of an angularly extending end portion 25 on the backing plate seated on a widened end portion of the mounting member 22 and secured in place for easy removability by the detachable connection 23 referred to above. The main body of the backing plate which is seated against the flat face of the mounting member 22 is of arcuate segmental form and the brake lining is removably mounted on the flat side of said plate opposite its side seated on the mounting member.

As disclosed and claimed in Patent No. 2,451,326, the removable lining comprises a plurality of circumferentially and radially spaced individual composition lining pads or blocks 26, shown in this instance to be six in number, arranged in radial pairs along two arcuate lines of different radii. For convenience of manufacture and assembly, these blocks are all mounted on a unitary sheet metal stamping 27 which is divided by flexible radial connecting portions 28 and flexible circumferential connecting portions 29 into six pan-like sections corresponding to the number of lining blocks 26, and one of the lining blocks is secured, as by cementing or riveting, to the bottom of each of said sections. In the drawings, the end blocks are shown as being cemented and the intermediate blocks are shown as being riveted, but the manner of fastening these usual brake shoe linings is immaterial insofar as the present invention is concerned.

The pan-like recesses in the linings 27 opposite the lining blocks form shallow recesses which receive rubber pads 29'. The linings 27 are secured to the backing plate 24 by posts or studs 30 which are secured to the plate and pass through the stamping, the plate being retained and the rubber pad being held in compression by wires 31 threaded through holes in the posts. This arrangement provides for the blocks to follow the movements of the surface of the brake disk and equalize pressure.

The assembly thus far described conforms to existing practice. According to the present invention, the end blocks of usual brake lining are foreshortened from their outer ends for about half their circumferential length and there is substituted for the missing portions metal grid block elements 35 of a metal which is softer than that forming the brake disk. The metal block elements are backed by lining elements 36 of a woven composition material like that of the end lining blocks for added resilience. The metal block elements are secured to the linings 27 by screws 37 entered from the back.

The metal grid block elements are formed of a metal which is hard enough to remove the ice film, yet soft enough to avoid undue wear on the brake disk. Bronze has been found to be suitable for this purpose. By way of example, one alloy which has been found to be satisfactory has the following composition:

|  | Min., Percent | Max., Percent |
|---|---|---|
| Copper | 78.00 | 82.00 |
| Zinc |  | .75 |
| Tin | 9.00 | 11.00 |
| Lead | 8.00 | 11.00 |
| Antimony |  | .50 |
| Iron |  | .15 |
| Phos |  | .25 |
| Nickel |  | .50 |

This is identified as SAE 64. From tests it appears that friction builds up more rapidly after the ice is shaved off if the lead is somewhat scattered instead of being completely homogeneously dispersed throughout the body of the alloy.

It has also been found that the grid blocks are kept cleaner with less tendency for the slots to ice up if the slots are made about 3/16" wide.

In service the metal grid blocks appear to wear back faster than the associated composition lining blocks so as to come into action with heavier braking pressures, leaving the regular lining to have its usual effect for normal pressure applications.

Extensive tests under icing conditions have shown that brakes made according to the present invention effectively eliminate the ice film and provide stops within the times permitted for normal brakes but without excessive wear on the brake disks.

While one embodiment of the invention has been described to illustrate the invention, it will be understood that there may be other embodiments within the general scope of the invention.

What is claimed is:

1. A brake shoe assembly comprising a backing member and a plurality of spaced-apart brake lining segments secured in circumferential alignment to said backing member, intermediate segments being formed of composition material, and terminal elements being formed of a metal softer than iron, such for example as bronze, having a grid wearing surface formed by intersecting grooves.

2. A brake shoe assembly comprising a backing member and a plurality of spaced-apart brake lining segments secured in circumferential alignment to said backing member, intermediate segments being formed of composition material, and terminal elements being formed of a metal softer than iron, such for example as bronze, having a grid wearing surface formed by intersecting grooves, said grooves being about 3/16" wide for the purposes set forth.

3. A brake shoe assembly comprising a backing member and a plurality of spaced-apart brake lining segments secured in circumferential alignment to said backing member, intermediate segments being formed of molded composition material, adjacent segments being formed of woven composition material, and end segments being formed of a metal softer than iron having a grid wearing surface formed by intersecting grooves.

4. A brake shoe assembly comprising a backing member and a plurality of spaced-apart brake lining segments secured in circumferential alignment to said backing member, intermediate segments being formed of a molded composition material, adjacent segments being formed of woven composition material, and end elements being formed of a metal softer than iron and having a gridded wearing surface, and a resilient backing layer disposed between said backing member and said lining segments.

5. A brake shoe assembly comprising a backing member and a plurality of spaced-apart brake lining segments secured in circumferential alignment to said backing member, intermediate segments being formed of molded composition material, adjacent segments being formed of woven composition material, and end segments being formed of a metal softer than iron, such for example as that known as SAE 64 bronze, said end segments having a grid wearing surface, and a resilient backing layer of woven composition material disposed between said backing member and said metal end segments.

6. A brake assembly comprising in combination with a rotary cast iron brake disk, brake shoes for acting on said disk, each brake shoe comprising a backing member and a plurality of spaced-apart brake lining segments secured in circumferential alignment to said backing member, intermediate segments being formed of molded composition material, adjacent segments being formed of woven composition material, and end segments being formed of a metal softer than iron, such for example as bronze, having a grid wearing surface formed by intersecting grooves, and a resilient backing layer between said backing member and said segments.

7. A brake assembly comprising in combination with a rotary cast iron brake disk, brake shoes for acting on said disk, each brake shoe comprising a backing member and a plurality of spaced-apart brake lining segments secured in circumferential alignment to said backing member, intermediate segments being formed of molded composition material, adjacent segments being formed of woven composition material, and end segments being formed of a metal softer than iron, such for example as bronze, having a grid wearing surface formed by intersecting grooves, and a resilient backing layer between said backing member and said segments, the intersecting grid grooves being arranged respectively in radial and circumferential directions.

References Cited in the file of this patent

UNITED STATES PATENTS

| | | |
|---|---|---|
| 1,672,486 | Ewing | June 5, 1928 |
| 1,700,493 | Guay | Jan. 29, 1929 |
| 2,122,405 | Bockius et al. | July 5, 1938 |
| 2,431,774 | Schumacher | Dec. 2, 1947 |
| 2,438,483 | Tack | Mar. 23, 1948 |
| 2,451,326 | Eksergian et al. | Oct. 12, 1948 |